(12) United States Patent
Shiraishi

(10) Patent No.: US 7,603,876 B2
(45) Date of Patent: *Oct. 20, 2009

(54) OPTICAL GLASS, SHAPABLE GLASS MATERIAL FOR PRESS-SHAPING, OPTICAL ELEMENT AND PROCESS FOR PRODUCING OPTICAL ELEMENT

(75) Inventor: Koichiro Shiraishi, Tokyo (JP)

(73) Assignee: Hoya Corporation, Tokyo (JP)

( * ) Notice: Subject to any disclaimer, the term of this patent is extended or adjusted under 35 U.S.C. 154(b) by 392 days.

This patent is subject to a terminal disclaimer.

(21) Appl. No.: 10/917,438

(22) Filed: Aug. 13, 2004

(65) Prior Publication Data

US 2005/0049132 A1 Mar. 3, 2005

(30) Foreign Application Priority Data

Aug. 29, 2003 (JP) ............................ 2003-306111

(51) Int. Cl.
*C03B 11/02* (2006.01)
*C03C 3/21* (2006.01)

(52) U.S. Cl. ................. 65/64; 65/63; 501/46; 501/901; 501/45; 501/47; 501/48

(58) Field of Classification Search .................. 501/46, 501/901, 45, 47, 48; 65/63, 64
See application file for complete search history.

(56) References Cited

U.S. PATENT DOCUMENTS

| 4,115,131 | A  | * | 9/1978 | Ishibashi et al. | ............... | 501/42 |
| 6,875,714 | B2 | * | 4/2005 | Izuki | ............................ | 501/45 |
| 6,995,101 | B2 | * | 2/2006 | Zou et al. | ...................... | 501/46 |
| 7,060,640 | B2 | * | 6/2006 | Ogino et al. | .................. | 501/45 |
| 2002/0042337 | A1 | * | 4/2002 | Zou et al. | ..................... | 501/45 |
| 2003/0220182 | A1 | * | 11/2003 | Izuki | ............................ | 501/46 |
| 2004/0018933 | A1 | * | 1/2004 | Ogino et al. | .................. | 501/45 |
| 2005/0049132 | A1 | * | 3/2005 | Shiraishi | ....................... | 501/46 |
| 2005/0113239 | A1 | * | 5/2005 | Miyata et al. | ................. | 501/45 |
| 2005/0164862 | A1 | * | 7/2005 | Shiraishi | ....................... | 501/45 |
| 2006/0058171 | A1 | * | 3/2006 | Izuki | ............................ | 501/47 |
| 2006/0081010 | A1 | * | 4/2006 | Zou et al. | ...................... | 65/385 |
| 2007/0027016 | A1 | * | 2/2007 | Ogino et al. | .................. | 501/45 |

FOREIGN PATENT DOCUMENTS

| JP | 06345481 A | * | 12/1994 |
| JP | A-6-345481 | | 12/1994 |
| JP | 08-104537 | | 4/1996 |
| JP | 08/157231 | | 6/1996 |
| JP | 08157231 A | * | 6/1996 |
| JP | 2747964 B2 | * | 5/1998 |
| JP | 2002-173336 | | 6/2002 |
| JP | 2003212592 A | * | 7/2003 |

OTHER PUBLICATIONS

Derwent Abstract 2003-598736, an English language Abstract of JP 2003-212592 A.*
Derwent Abstract 1996-254991, an English language Abstract of JP 08-104537 A.*

* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

An optical glass that has high-refractivity and high-dispersion properties, that is less colored and that is suitable for a shapable glass material for press-shaping and various optical elements, the optical glass containing, as glass components and by mass %, 10 to 32% of $P_2O_5$, 27 to 65% of $Nb_2O_5$, 10 to 30% of BaO, 0 to 12% of $B_2O_3$, more than 0% but not more than 20% of $TiO_2$, more than 0% but not more than 10% of total of $Li_2O$, $Na_2O$ and $K_2O$, and more than 0% but not more than 1%, based on the total content of the said glass components, of $Sb_2O_3$, and having a light transmittance that is 50% at a wavelength of 420 nm or shorter.

11 Claims, No Drawings

OPTICAL GLASS, SHAPABLE GLASS MATERIAL FOR PRESS-SHAPING, OPTICAL ELEMENT AND PROCESS FOR PRODUCING OPTICAL ELEMENT

BACKGROUND OF THE INVENTION

1. Field of the Invention

The present invention relates to an optical glass, a shapable glass material for press-shaping, an optical element and a process for producing the optical element. More specifically, it relates to an optical glass that has high-refractivity and high-dispersion properties and that is less colored, a shapable glass material made of the optical glass for press-shaping, an optical element made of the optical glass and a process for producing the optical element.

2. Related Art Statement

In recent years, there are increasing demands for optical glass having high-refractivity and high-dispersion properties. As such a glass, there is known an optical glass having a phosphate-based glass composition as a base material and containing a relatively large amount of components for providing a high refractive index, such as $TiO_2$ and the like. (for example, see JP-A-6-345481)

However, the above glass contains a relatively large amount of components for providing a high refractive index such as $TiO_2$ and the like while having a phosphate-base glass composition as a base, and as a result, the glass is liable to be colored and has a problem from the viewpoint of a color degree. In the invention of the above JP-A-6-345481, attempts are made to heat-treat the optical glass for improving the glass in coloring. In this case, however, a heat-treatment step is required, and the production procedure inevitably comes to be complicated. Further, there is a problem that it is difficult to impart the entire glass with a uniform color degree.

DISCLOSURE OF THE INVENTION

Under the circumstances, it is an object of the present invention to provide an optical glass that has high-refractivity and high-dispersion properties and that is less colored, a shapable glass material for press-shaping, made of the above glass, an optical element made of the above glass, and a process for producing the above optical element.

For achieving the above object, the present inventors have made diligent studies and as a result have found that the above object can be achieved by an optical glass having a specific composition and having a light transmittance that is 50% at a predetermined value of wavelength or a smaller value of wavelength. The present invention has been accordingly completed on the basis of the above finding.

That is, the present invention provides;

(1) An optical glass comprising, as glass components and by mass %, 10 to 32% of $P_2O_5$, 27 to 65% of $Nb_2O_5$, 10 to 30% of BaO, 0 to 12% of $B_2O_3$, more than 0% but not more than 20% of $TiO_2$, more than 0% but not more than 10% of total of $Li_2O$, $Na_2O$ and $K_2O$, and more than 0% but not more than 1%, based on the total content of the said glass components, of $Sb_2O_3$, and having a light transmittance that is 50% at a wavelength of 420 nm or shorter, (2) An optical glass of above (1), which contains by mass %, 0 to 3% of $Li_2O$, 0 to 9% of $Na_2O$ and 0 to 9% of $K_2O$, (3) An optical glass of above (1), which further contains by mass %, 0 to 6% of CaO, 0 to 6% of SrO, 0 to 6% of ZnO, 0 to 4% of $SiO_2$ and 0 to 4% of $ZrO_2$, (4) An optical glass of above (1), which contains by mass %, 0.5 to 19% of $TiO_2$, (5) An optical glass of above (1), which contains by mass %, 12 to 28% of $P_2O_5$, 32 to 63% of $Nb_2O_5$ and 2 to 18% of $TiO_2$, (6) An optical glass of above (1), which contains by mass %, 95% or more of total content of $P_2O_5$, $Nb_2O_5$, BaO, $B_2O_3$, $TiO_2$, $Na_2O$, $K_2O$, ZnO and $SiO_2$, (7) An optical glass of above (1), which contains 0.01 to 0.7 mass %, based on the total content of the glass components, of the $Sb_2O_3$, (8) An optical glass of above (7), which contains 0.01 to 0.5 mass %, based on the total content of the glass components, of the $Sb_2O_3$, (9) An optical glass of above (1), which has a refractive index (nd) of at least 1.86,

(10) An optical glass of above (1), which has an Abbe's number (vd) of 24 or less,

(11) An optical glass of above (1), which has a liquidus temperature of 1,150 or lower,

(12) A shapable glass material for press-shaping, which is made of the optical glass of above (1), and is to be press-shaped,

(13) An optical element which is made of the optical glass of above (1), and

(14) A process for producing an optical element, which comprises softening the shapable glass material for press-shaping as recited in above (12), under heat and press-shaping the softened glass material.

EFFECT OF THE INVENTION

According to the present invention, there can be provided an optical glass that has high-refractivity and high-dispersion properties and that is less colored, a shapable glass material for press-shaping for obtaining an optical element made of the above optical glass by press-shaping, an optical element made of the above optical glass, and a process for producing the optical element.

PREFERRED EMBODIMENTS OF THE INVENTION

First, the optical glass of the present invention will be explained below.

The optical glass of the present invention is an optical glass comprising, as glass components and by mass %, 10 to 32% of $P_2O_5$, 27 to 65% of $Nb_2O_5$, 10 to 30% of BaO, 0 to 12% of $B_2O_3$, more than 0% but not more than 20% of $TiO_2$, more than 0% but not more than 10% of total of $Li_2O$, $Na_2O$ and $K_2O$, and more than 0% but not more than 1%, based on the total content of the said glass components, of $Sb_2O_3$, and having a light transmittance that is 50% at a wavelength of 420 nm or shorter.

The above light transmittance refers to a spectral transmittance obtained by preparing a glass sample having surfaces that are in parallel with each other and that are polished so that the glass sample has a thickness of 10.0±0.1 mm and allowing light to enter the above polished surface vertically. The above polishing of the surfaces means that the surfaces are flattened and smoothened into a state in which the roughness of the surfaces is sufficiently small relative to the wavelength of a measurement wavelength region. The above spectral transmittance is measured in the wavelength region of 280 to 700 nm. When the wavelength at which the light transmittance is 5% is supposed to be $\lambda_5$, the light transmittance increases as the wavelength is increased from $\lambda_5$, and when the light transmittance reaches at least 70%, a high transmittance of at least 70% is maintained until the wavelength comes to be 700 nm.

When the optical glass has the above glass composition, there can be obtained a remarkably high refractive index (nd) of at least 1.86. When a high-refractivity component is present in a $P_2O_5$-containing glass, the component is reduced, and absorption appears on a shorter wavelength side. For decreasing the above absorption and attaining the above light transmittance, it is essential to incorporate $Sb_2O_3$. When the content of $Sb_2O_3$ incorporated is large, $Sb_2O_3$ absorbs light, so that the glass is colored. The content of $Sb_2O_3$ is therefore limited to the above range. The content of $Sb_2O_3$ based on the total content of the glass components is 0.01 to 0.7 mass %, more preferably 0.01 to 0.5 mass %. The content of $Sb_2O_3$ based on the total content of the glass components refers to a content of $Sb_2O_3$ based on the total content of the glass components excluding $Sb_2O_3$.

The optical glass of the present invention contains none of PbO and $As_2O_3$. While PbO works to increase the refractive index of the glass, it is a substance that will cause an environmental problem. While $As_2O_3$ has a high defoaming effect and has a high effect on the prevention of the coloring of the glass, it is also a substance that will cause an environmental problem. In the present invention, therefore, these substances are precluded from the glass composition.

The components and reasons for limitations of the contents thereof in the optical glass of the present invention will be explained below. The contents by % shown below represent contents by mass %.

$P_2O_5$ is an essential component as a glass-network-forming component in a phosphate glass. As compared with a silicate glass, a phosphate glass has characteristic features in that it can be melted at a low temperature and that it has a high light transmittance in a visible light region. It is therefore required to incorporate at least 10% of $P_2O_5$. On the other hand, when it exceeds 32%, it is difficult to attain the high-refractivity property. The content of $P_2O_5$ is therefore limited to the range of 10 to 32%. The content of $P_2O_5$ is preferably in the range of 12 to 30%, more preferably 12 to 28%.

$Nb_2O_5$ is an essential component for obtaining the high-refractivity and high-dispersion properties intended in the present invention, and it is also a component that improves the glass in chemical durability. When the content of $Nb_2O_5$ is less than 27%, the intended high-refractivity and high-dispersion properties can be no longer obtained. When it exceeds 65%, the glass is degraded in devitrification resistance. The content of $Nb_2O_5$ is therefore limited to the range of 27 to 65%. The content of $Nb_2O_5$ is preferably in the range of 30 to 64%, more preferably 32 to 63%.

BaO is an essential component for attaining the intended high-refractivity and high-dispersion properties. While BaO is a component for increasing the refractive index, it does not easily degrade the coloring degree even when it is introduced in a large amount. The content of BaO is therefore limited to 10 to 30%. The content thereof is preferably 14 to 28%.

$TiO_2$ is a component effective for attaining the intended high-refractivity and high-dispersion properties, and it has a remarkably high effect on the improvement of the glass in chemical durability. When the content of $TiO_2$ exceeds 20%, the glass is degraded in devitrification resistance, and the glass comes to have poor coloring degree. The content of $TiO_2$ is therefore limited to more than 0% but not more than 20%. The content of $TiO_2$ is preferably in the range of 0.5 to 19%, more preferably in the range of 2 to 18%.

When added in a proper amount, $Li_2O$, $Na_2O$ and $K_2O$ can decrease the melting temperature of the glass and can decrease the liquidus temperature (LT) of the glass. When the total content of $Li_2O$, $Na_2O$ and $K_2O$ is 10% or more, however, it is difficult to attain the intended high-refractivity and high-dispersion properties. The total content of $Li_2O$, $Na_2O$ and $K_2O$ is therefore limited to less than 10%.

The content of $Li_2O$ is preferably 0 to 3%, the content of $Na_2O$ is preferably 0 to 9%, and the content of $K_2O$ is preferably 0 to 9%. As an alkali metal oxide, preferably, $Na_2O$ alone, $K_2O$ alone or a combination of $Na_2O$ with $K_2O$ is incorporated, more preferably, $K_2O$ alone or a combination of $Na_2O$ with $K_2O$ is incorporated, and still more preferably, $Na_2O$ and $K_2O$ are incorporated.

In the optical glass of the present invention, CaO, SrO and ZnO are optional components that are added in a proper amount, and they have large effects of decreasing the liquidus temperature (LT) of the glass and improving the glass in devitrification resistance. When CaO, SrO and ZnO are introduced in an excess amount, it is difficult to attain the intended high-refractivity and high-dispersion properties. Preferably, therefore, the content of CaO is limited to the range of 0 to 6%, the content of SrO is limited to the range of 0 to 6%, and the content of ZnO is limited to the range of 0 to 6%.

When a proper amount of $B_2O_3$ is added to a glass, the glass is characteristically improved in devitrification resistance. Particularly, when a proper amount of $B_2O_3$ is added to a glass containing $P_2O_5$, $Nb_2O_5$ and $TiO_2$, the glass is remarkably improved in devitrification resistance. When the content of $B_2O_3$ exceeds 12%, however, the high-refractivity and high-dispersion properties can be no longer attained. The content of $B_2O_3$ is therefore limited to the range of 0 to 12%. The content of $B_2O_3$ is preferably in the range of 0 to 8%.

In the optical glass of the present invention, $SiO_2$ and $ZrO_2$ may be introduced as optional components. Both $SiO_2$ and $ZrO_2$ can decrease the coloring of the glass and can improve the glass in devitrification resistance when added in a small amount. However, when added in an excess amount, it is difficult to attain the intended high-refractivity and high-dispersion properties. Therefore, the content of $SiO_2$ is preferably limited to 0 to 4%, and the content of $ZrO_2$ is preferably limited to 0 to 4%. More preferably, the content of $SiO_2$ is 0 to 2%, and the content of $ZrO_2$ is 0 to 2%.

Further, components such as $La_2O_3$, $Y_2O_3$, $Gd_2O_3$, $Ta_2O_5$, $WO_3$, MgO, $Cs_2O$, and the like may be introduced as required so long as they do not impair the object of the present invention.

The preferred contents of the above components may be combined as required, and $Sb_2O_3$ may be added so as to have the above preferred content.

For example, preferred glass compositions of the optical glass of the present invention will be shown as below. Of the ranges of the contents of the above components, the optical glass of the present invention preferably has a glass composition containing 12 to 30% of $P_2O_5$, 30 to 64% of $Nb_2O_5$, 14 to 28% of BaO, 0.5 to 19% of $TiO_2$, 0 to 3% of $Li_2O$, 0 to 9% of $Na_2O$, 0 to 9% of $K_2O$ , 0 to 6% of CaO, 0 to 6% of SrO, 0 to 6% of ZnO and 0 to 8% of $B_2O_3$. In the optical glass having the above glass composition, more preferably, the content of $P_2O_5$ is 12 to 28%, the content of $Nb_2O_5$ is 32 to 63%, and the content of $TiO_2$ is 2 to 18%.

For satisfying the above various requirements, it is preferred to adjust the total content of $P_2O_5$, $Nb_2O_5$, BaO, $B_2O_3$, $TiO_2$, $Na_2O$, $K_2O$, ZnO and $SiO_2$ to 95% or more, it is more preferred to adjust the above total content to 98% or more, it is still more preferred to adjust the above content to 99% or more, and it is particularly preferred to adjust the above content to 100%.

The above glass composition can realize an optical glass having, as optical constants, an refractive index (nd) of at least 1.86, preferably 1.86 to 1.96 and an Abbe's number (vd) of 24 or less, preferably 24 to 18.

Desirably, the optical glass of the present invention has a liquidus temperature of 1,150° C. or lower. When the optical glass has stability in such a high-temperature range, the optical glass can be more improved in shapability when it is shaped in a molten state.

Further, the optical glass of the present invention has a viscosity suitable for shaping when a molten glass thereof is shaped, so that there can be also provided an optical glass having excellent high-temperature shapability.

The optical glass having the above composition, provided by the present invention, can be produced as follows.

With regard to raw materials for producing the optical glass of the present invention, orthophosphoric acid ($H_3PO_4$), metaphosphoric acid, diphosphorus pentoxide, or the like can be used for $P_2O_5$, and carbonates, nitrates, oxides, etc., can be used as required for the other components. For further decreasing the coloring of the glass, however, metaphosphoric acid is preferred as a raw material for $P_2O_5$. It is thought that the coloring of the glass is related to the water content in the glass. From the above point of view, it is advantageous to use a metaphosphoric acid raw material that brings a relatively less content of water into the glass. These raw materials are weighed so as to provide a predetermined composition and mixed to prepare a formulated raw material, and the formulated raw material is charged into a melting furnace under heat at approximately 1,000 to 1,200° C., melted, clarified and then homogenized by stirring. Then, the raw material is cast into a mold and gradually cooled, whereby the optical glass of the present invention can be obtained.

In this case, oxygen may be added to the atmosphere of the melting furnace to increase an oxygen partial pressure. Further, oxidizing gas such as oxygen gas may be blown into the melting furnace to carry out bubbling. In this manner, a high-refractivity glass having the above excellent transmittance property can be produced.

The shapable glass material for press-shaping in the present invention and the method of preparing the same will be explained below.

The shapable glass material for press-shaping refers to a glass material that is to be press-shaped, and it has a mass nearly equivalent to the mass of a press-shaped article and is made of the optical glass of the present invention.

First, a fully clarified and homogenized molten glass is allowed to continuously flow out of a flow pipe and cast into a mold. A molten glass that is cast into a mold and extended in the form of a plate is cooled and solidified to have the form of a sheet glass. The thus-formed sheet glass is continuously withdrawn from the mold, whereby a plate-shaped glass having a constant width and a constant thickness can be obtained. The above glass is annealed and then cut to predetermined dimensions to prepare a plurality of glass pieces that are called cut pieces. Each cut piece is subjected to processing procedures such as barrel polishing, etc., to adjust the cut piece so that it has the mass of a press-shaped product, whereby the shapable glass material for press-shaping is obtained.

Alternatively, there may be employed another method in which a molten glass gob having a predetermined amount is separated from a molten glass that is flowing out, received with a shaping mold member and shaped into a glass gob, whereby the shapable glass material for press-shaping is obtained. In this method, the glass gob may be subjected to processing procedures such as barrel polishing, to finish the shapable glass material for press-shaping.

The optical element of the present invention and the process for producing the same will be explained below.

The optical element of the present invention is made of the above optical glass. Examples of the optical element of the present invention include a lens, a prism and an optical substrate. Examples of the lens include various lenses such as a spherical lens, an asphericl lens and a lens array. Particularly, the optical glass of the present invention has a high refractive index, so that it is suitable for an image-sensing lens for a digital still camera, an image-sensing lens for a digital video camera, an image-sensing lens for a camera built in a cellular phone, an image-sensing lens for a camera built in a notebook computer, a lens such as a projector lens built in a projector such as a liquid crystal projector, and the like.

The process for producing an optical element, provided by the present invention, comprises heating and softening the above shapable glass material for press-shaping and press-shaping the shapable material. Examples of the process for producing an optical element, provided by the present invention, include a method in which a shapable glass material having smooth surfaces is heated to soften it and the softened glass material is precision press-shaped with a press mold in a non-oxidizing atmosphere of nitrogen, a gas mixture of nitrogen with hydrogen, or the like, and a method in which a shapable glass material for press-shaping is heated to soften it, the softened glass material is press-shaped and the press-shaped glass material is cut and polished to obtain an optical element.

The shapable glass material for press-shaping and the optical element, provided by the present invention, are made of the optical glass that is less colored, so that they are less colored. Further, they have a high refractive index and a high-dispersion property, so that they are highly utilizable.

EXAMPLES

The present invention will be explained more in detail with reference to Examples hereinafter, while the present invention shall not be limited by these Examples.

Optical glasses were measured for properties by the following methods.

(1) Refractive Index (nd) and Abbe's Number (vd)

An optical glass obtained by cooling at a temperature decrease rate of 30° C. per hour was measured.

(2) Liquidus Temperature (LT)

An optical glass was placed in a 50 ml crucible made of platinum, the crucible was covered and held in a furnace for 2 hours and cooled, and an inside of the glass was observed through a microscope of 100 magnifications to determine the liquidus temperature on the basis of whether or not a crystal was present.

(3) $\lambda_{50}$

In spectral transmittance obtained by measurement according to the method described in the present specification, a wavelength at which the transmittance was 50% was determined as $\lambda_{50}$ Examples 1-12

Optical glasses in Examples 1 to 12 and Comparative Examples 1 and 2 were prepared according to a general method so that the glasses had compositions shown in Tables 1 and 2. That is, orthophosphoric acid ($H_3PO_4$), metaphosphoric acid, diphosphorus pentoxide, or the like was provided for $P_2O_5$, and carbonates, nitrates, etc., were provided for the other components. These raw materials were weighed so as to provide the predetermined compositions and mixed to prepare formulated raw materials, and the formulated raw materials were respectively charged into a melting furnace under heat at 1,000 to 1,200° C., melted, clarified and then homogenized by stirring. Then, the raw materials were separately cast into a mold and gradually cooled, to give optical glasses.

In addition, the oxygen partial pressure in the atmosphere in the melting furnace may be adjusted so that it is higher than the oxygen partial pressure in atmosphere, and oxygen gas may be blown into the molten glass in the melting furnace.

Tables 1 and 2 show optical performances of the thus-obtained optical glasses.

TABLE 1

| | Example | | | | | |
|---|---|---|---|---|---|---|
| | 1 | 2 | 3 | 4 | 5 | 6 |
| Glass composition (mass %) | | | | | | |
| $P_2O_5$ | 12.0 | 14.5 | 19.5 | 23.5 | 19.5 | 30.0 |
| $Nb_2O_5$ | 50.0 | 48.0 | 45.0 | 34.5 | 45.5 | 32.0 |
| BaO | 21.0 | 24.0 | 16.5 | 16.0 | 16.0 | 23.0 |
| $B_2O_3$ | 7.0 | 2.5 | 2.5 | 3.0 | 3.0 | 2.0 |
| $TiO_2$ | 6.0 | 6.0 | 8.5 | 18.0 | 8.0 | 8.0 |
| $Li_2O$ | 0.0 | 0.0 | 0.0 | 0.0 | 0.0 | 0.0 |
| $Na_2O$ | 0.0 | 0.0 | 3.0 | 0.0 | 3.0 | 0.5 |
| $K_2O$ | 4.0 | 5.0 | 4.0 | 5.0 | 4.0 | 4.5 |
| $Li_2O + Na_2O + K_2O$ | (4.0) | (5.0) | (7.0) | (5.0) | (7.0) | (5.0) |
| CaO | 0.0 | 0.0 | 0.0 | 0.0 | 1.0 | 0.0 |
| SrO | 0.0 | 0.0 | 1.0 | 0.0 | 0.0 | 0.0 |
| ZnO | 0.0 | 0.0 | 0.0 | 0.0 | 0.0 | 0.0 |
| $SiO_2$ | 0.0 | 0.0 | 0.0 | 0.0 | 0.0 | 0.0 |
| $ZrO_2$ | 0.0 | 0.0 | 0.0 | 0.0 | 0.0 | 0.0 |
| Total | 100.0 | 100.0 | 100.0 | 100.0 | 100.0 | 100.0 |
| $Sb_2O_3$ (*) | 0.30 | 0.30 | 0.05 | 0.05 | 0.05 | 0.20 |
| Properties | | | | | | |
| nd | 1.9028 | 1.9491 | 1.9193 | 1.9309 | 1.9186 | 1.8615 |
| νd | 21.1 | 21.0 | 20.5 | 19.2 | 20.5 | 23.0 |
| $\lambda_{50}$ | 414 | 415 | 413 | 413 | 413 | 391 |
| LT (° C.) | 1130 | 1120 | 1090 | 1100 | 1100 | 1050 |

(*) Contents based on the total contents of the other components
LT: Liquidus temperature

TABLE 2

| | Example | | | | | |
|---|---|---|---|---|---|---|
| | 7 | 8 | 9 | 10 | 11 | 12 |
| Glass composition (mass %) | | | | | | |
| $P_2O_5$ | 20.0 | 20.5 | 20.0 | 20.0 | 21.0 | 21.5 |
| $Nb_2O_5$ | 46.0 | 44.0 | 62.0 | 43.0 | 42.0 | 42.5 |
| BaO | 18.0 | 19.0 | 14.0 | 19.5 | 19.5 | 21.0 |
| $B_2O_3$ | 3.0 | 2.0 | 1.0 | 3.0 | 3.0 | 2.0 |
| $TiO_2$ | 9.0 | 8.5 | 2.0 | 8.0 | 10.0 | 8.0 |
| $Li_2O$ | 1.0 | 0.0 | 0.0 | 0.0 | 0.0 | 0.0 |
| $Na_2O$ | 1.0 | 4.0 | 0.0 | 3.5 | 2.5 | 2.0 |
| $K_2O$ | 2.0 | 1.5 | 1.0 | 1.0 | 1.0 | 1.5 |
| $Li_2O + Na_2O + K_2O$ | (4.0) | (5.5) | (1.0) | (4.5) | (3.5) | (3.5) |
| CaO | 0.0 | 0.0 | 0.0 | 0.0 | 0.0 | 0.0 |
| SrO | 0.0 | 0.0 | 0.0 | 0.0 | 0.0 | 0.0 |
| ZnO | 0.0 | 0.0 | 0.0 | 1.0 | 1.0 | 1.0 |
| $SiO_2$ | 0.0 | 0.5 | 0.0 | 0.0 | 0.0 | 0.5 |
| $ZrO_2$ | 0.0 | 0.0 | 0.0 | 0.0 | 1.0 | 0.0 |
| Total | 100.0 | 100.0 | 100.0 | 100.0 | 100.0 | 100.0 |
| $Sb_2O_3$ (*) | 0.10 | 0.20 | 0.02 | 0.30 | 0.20 | 0.2 |
| Properties | | | | | | |
| nd | 1.9192 | 1.9140 | 1.9598 | 1.9236 | 1.9344 | 1.9221 |
| νd | 20.2 | 20.9 | 19.5 | 20.9 | 20.3 | 20.9 |
| $\lambda_{50}$ | 414 | 413 | 419 | 409 | 411 | 415 |
| LT (° C.) | 1080 | 1070 | 1140 | 1070 | 1090 | 1080 |

(*) Contents based on the total contents of the other components
LT: Liquidus temperature As shown in Tables 1 and 2, the optical glasses obtained in Examples 1 to 12 exhibited a $\lambda_{50}$ of 420 nm or shorter and had a high refractive index of 1.86 or greater and a high-dispersion property represented by an Abbe's number (νd) of 24 to 18. Further, they had a liquidus temperature of 1,150° C. or lower, and they were excellent in devitrification resistance since they were free of devitrification when held at temperatures around their softening temperatures for 30 minutes.

Comparative Examples 1 and 2

Optical glasses having compositions shown in Table 3 were prepared in the same manner as in Examples 1 to 12. Table 3 shows optical performances thereof.

TABLE 3

|  | Comparative Example 1 | Comparative Example 2 |
|---|---|---|
| Glass composition (mass %) |  |  |
| $P_2O_5$ | 20.0 | 22.5 |
| $Nb_2O_5$ | 43.5 | 50.0 |
| BaO | 20.5 | 2.0 |
| $B_2O_3$ | 2.5 | 3.5 |
| $TiO_2$ | 8.3 | 14.0 |
| $Li_2O$ | 0.0 | 0.0 |
| $Na_2O$ | 3.5 | 6.0 |
| $K_2O$ | 1.5 | 2.0 |
| $Li_2O + Na_2O + K_2O$ | (5.0) | (8.0) |
| CaO | 0.0 | 0.0 |
| SrO | 0.0 | 0.0 |
| ZnO | 0.0 | 0.0 |
| $SiO_2$ | 0.2 | 0.0 |
| $ZrO_2$ | 0.0 | 0.0 |
| Total | 100.0 | 100.0 |
| $Sb_2O_3$ (*) | 0.0 | 0.1 |
| Properties |  |  |
| nd | 1.9207 | 1.9478 |
| νd | 20.9 | 18.2 |
| $\lambda_{50}$ | 460 | 440 |
| LT (° C.) | 1070 | 1110 |

(*) Contents based on the total contents of the other components
LT: Liquidus temperature Since the glass in Comparative Example 1 contained no $Sb_2O_3$, it was intensely colored, and it exhibited a $\lambda_{50}$ that shifted toward a long wavelength side. The glass in Comparative Example 2 had required optical properties by using a small amount of BaO, so that it was intensely colored, and it exhibited a $\lambda_{50}$ that shifted toward a long wavelength side.

Example 13

Each of optical glasses of Examples 1 to 12 was separately allowed to flow out at a constant flow rate and cast into a mold to form glass plates made of the optical glasses of Examples 1 to 12. These glass plates were annealed and then cut to predetermined dimensions to obtain cut pieces. Then, the cut pieces were barrel-polished to adjust the cut pieces to a mass of press-shaped products. A powder mold release agent was uniformly applied to the entire surface of each of the thus-obtained shapable glass materials for press-shaping. Then, each shapable glass material was heated and softened in atmosphere, and each of the softened shapable glass materials was press-shaped with a press mold so that they had a form similar to the form of a lens as an end product.

The thus-obtained press-shaped products were annealed, and then they were cut and polished to obtain lenses made of the glasses of Examples 1 to 12. The thus-obtained lenses were less colored even when they were visually observed.

While this Example employed lenses as an embodiment, other optical elements such as a prism, an optical substrate, etc., can be similarly produced.

INDUSTRIAL UTILITY

The optical glass of the present invention has high-refractivity and high-dispersion properties and is less colored, and it can be suitably used for a shapable glass material and various optical elements.

The invention claimed is:

1. A process for producing an optical element, which comprises (a) softening a shapable optical glass material for press-shaping under heat and (b) press-shaping the softened optical glass;
   wherein the optical glass comprises, as glass components and by mass %, 10 to 32% of $P_2O_5$, 27 to 65% of $Nb_2O_5$, 10 to 30% of BaO, 0 to 12% of $B_2O_3$, more than 0% but not more than 20% of $TiO_2$, more than 0% but not more than 10% of total of $Li_2O$, $Na_2O$ and $K_2O$, and more than 0% but not more than 1%, based on the total content of the said glass components, of $Sb_2O_3$,
   wherein the amount of BaO and $Sb_2O_3$ are adjusted to provide the optical glass with a light transmittance that is 50% at a wavelength of 420 nm or shorter, and
   wherein the optical glass has a refractive index (nd) of at least 1.86 and an Abbe's number (νd) of 24 or less.

2. The process of claim 1 wherein the optical glass contains by mass %, 0 to 3% of $Li_2O$, 0 to 9% of $Na_2O$ and 0 to 9% of $K_2O$.

3. The process of claim 1 wherein the optical glass further contains by mass %, 0 to 6% of CaO, 0 to 6% of SrO, 0 to 6% of ZnO, 0 to 4% of $SiO_2$ and 0 to 4% of $ZrO_2$.

4. The process of claim 1 wherein the optical glass contains by mass %, 0.5 to 19% of $TiO_2$.

5. The process of claim 1 wherein the optical glass contains by mass %, 12 to 28% of $P_2O_5$, 32 to 63% of $Nb_2O_5$ and 2 to 18% of $TiO_2$.

6. The process of claim 1 wherein the optical glass contains by mass %, 95% or more of total content of $P_2O_5$, $Nb_2O_5$, BaO, $B_2O_3$, $TiO_2$, $Na_2O$, $K_2O$, ZnO and $SiO_2$.

7. The process of claim 1 wherein the optical glass contains 0.01 to 0.7 mass %, based on the total content of the glass components, of the $Sb_2O_3$.

8. The process of claim 7 wherein the optical glass contains 0.01 to 0.5 mass %, based on the total content of the glass components, of the $Sb_2O_3$.

9. The process of claim 1 wherein the optical glass has a liquidus temperature of 1,150° C. or lower.

10. The process of claim 1 wherein the glass components are melted in a melting furnace in which oxygen is added to a melting atmosphere to increase oxygen partial pressure higher than the atmosphere.

11. The process of claim 1 wherein the glass components are melted in a melting furnace and an oxidizing glass is bubbled into the molten glass.

* * * * *